(12) United States Patent
Meah et al.

(10) Patent No.: US 9,391,714 B2
(45) Date of Patent: Jul. 12, 2016

(54) SAFETY SYSTEM

(75) Inventors: Faruk Meah, Woking (GB); Andrew D. Naish, Staines (GB)

(73) Assignee: TYCO FIRE & SECURITY GMBH, Neuhausen Am Rhein Fall (CH)

( * ) Notice: Subject to any disclaimer, the term of this patent is extended or adjusted under 35 U.S.C. 154(b) by 670 days.

(21) Appl. No.: 13/877,312

(22) PCT Filed: Oct. 4, 2011

(86) PCT No.: PCT/GB2011/001443
§ 371 (c)(1),
(2), (4) Date: Aug. 2, 2013

(87) PCT Pub. No.: WO2012/045996
PCT Pub. Date: Apr. 12, 2012

(65) Prior Publication Data
US 2013/0315605 A1    Nov. 28, 2013

(30) Foreign Application Priority Data

Oct. 4, 2010   (GB) .................................. 1016685.8

(51) Int. Cl.
*H04B 10/00* (2013.01)
*H04B 10/60* (2013.01)
*G08B 25/00* (2006.01)
*G08B 29/14* (2006.01)
*H04J 14/00* (2006.01)

(52) U.S. Cl.
CPC .............. *H04B 10/60* (2013.01); *G08B 25/003* (2013.01); *G08B 29/14* (2013.01)

(58) Field of Classification Search
CPC .................................. H04B 10/60; H04B 10/40
See application file for complete search history.

(56) References Cited

U.S. PATENT DOCUMENTS

| | | | | |
|---|---|---|---|---|
| 2005/0169636 A1* | 8/2005 | Aronson | ............... | G01M 11/00 398/136 |
| 2006/0093367 A1* | 5/2006 | Ekkizogloy | ............ | H04B 10/40 398/135 |
| 2006/0239690 A1* | 10/2006 | Dybsetter | ........... | G06F 13/4291 398/135 |
| 2010/0028015 A1* | 2/2010 | Hosking | ................ | H04B 10/07 398/135 |
| 2012/0045201 A1* | 2/2012 | Skubic | ................. | H04B 10/272 398/38 |

FOREIGN PATENT DOCUMENTS

| | | |
|---|---|---|
| EP | 0361585 A2 | 4/1990 |
| EP | 0872817 A1 | 10/1998 |
| WO | 2008/014592 A1 | 2/2008 |

OTHER PUBLICATIONS

International Search Report for PCT/GB2011/001443, dated Jan. 27, 2012.

* cited by examiner

*Primary Examiner* — Daniel Dobson

(57) ABSTRACT

A nodal system (10) includes a unit (D) having a memory (42) and an optical data receiver (36), and a common control unit (12) in communication with the unit. A method of commissioning the system comprises the steps of activating the optical data receiver on the unit, and transmitting an optical data signal to the unit, thereby commissioning the unit.

14 Claims, 11 Drawing Sheets

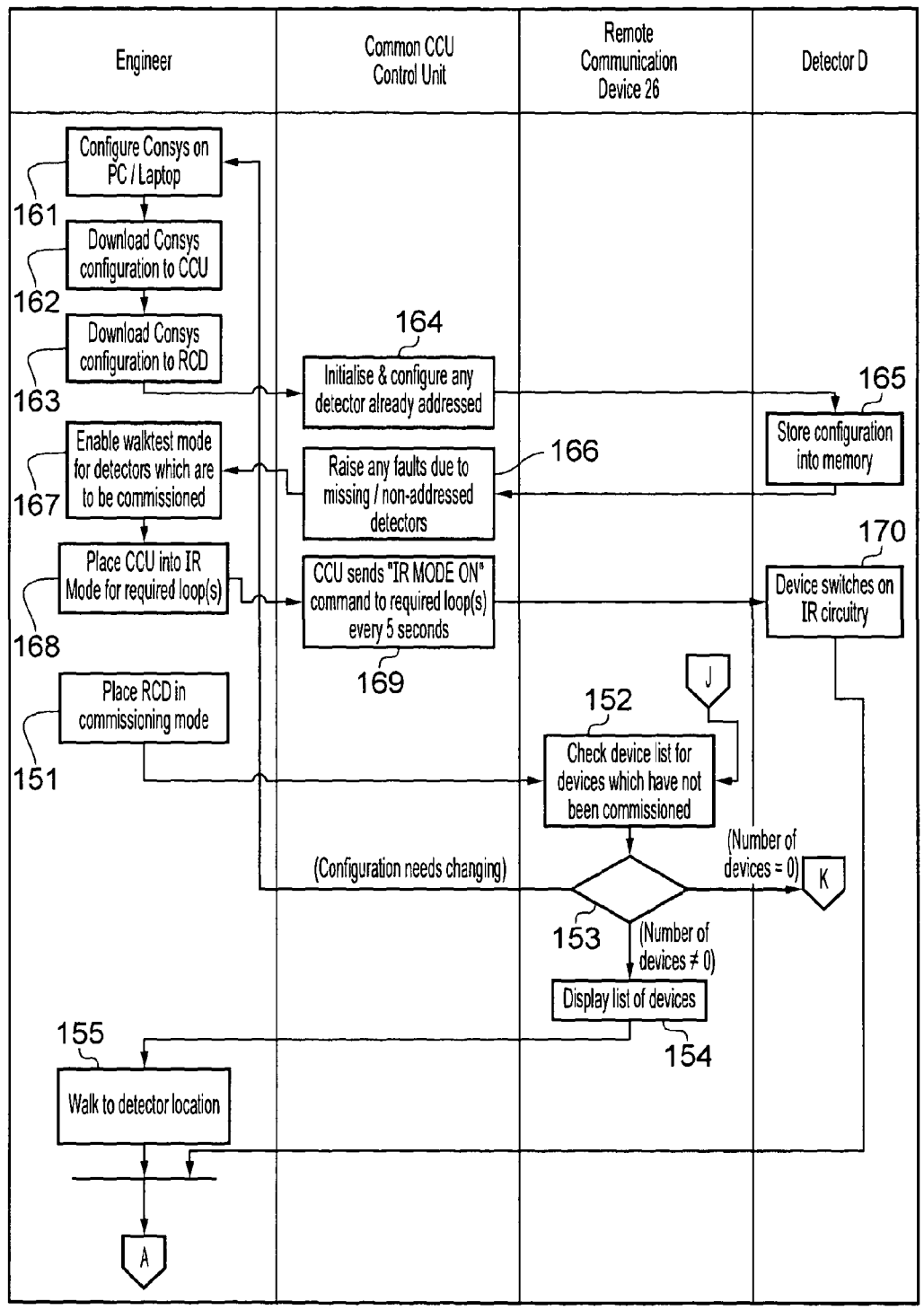
FIG. 7.1

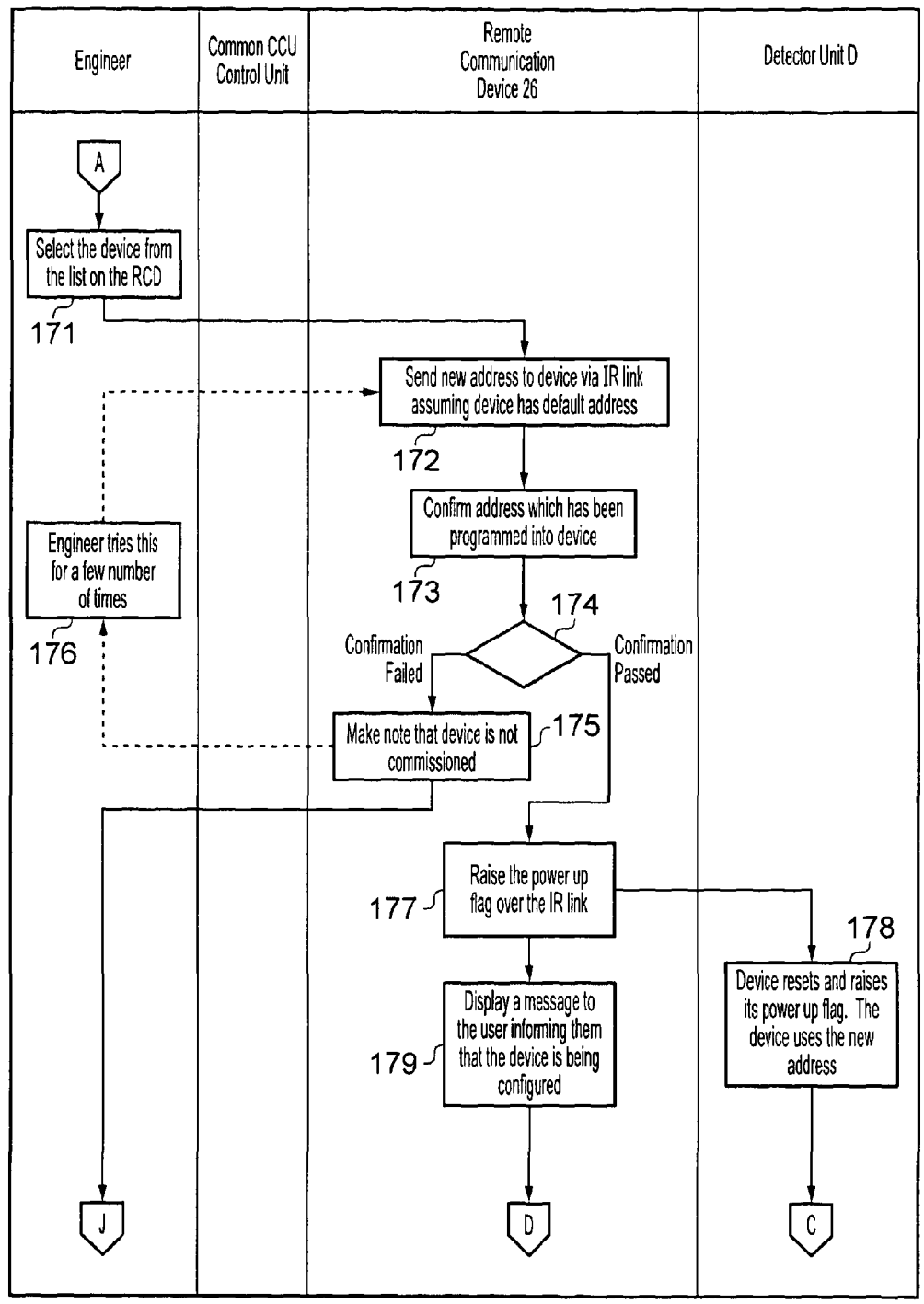
FIG. 7.2

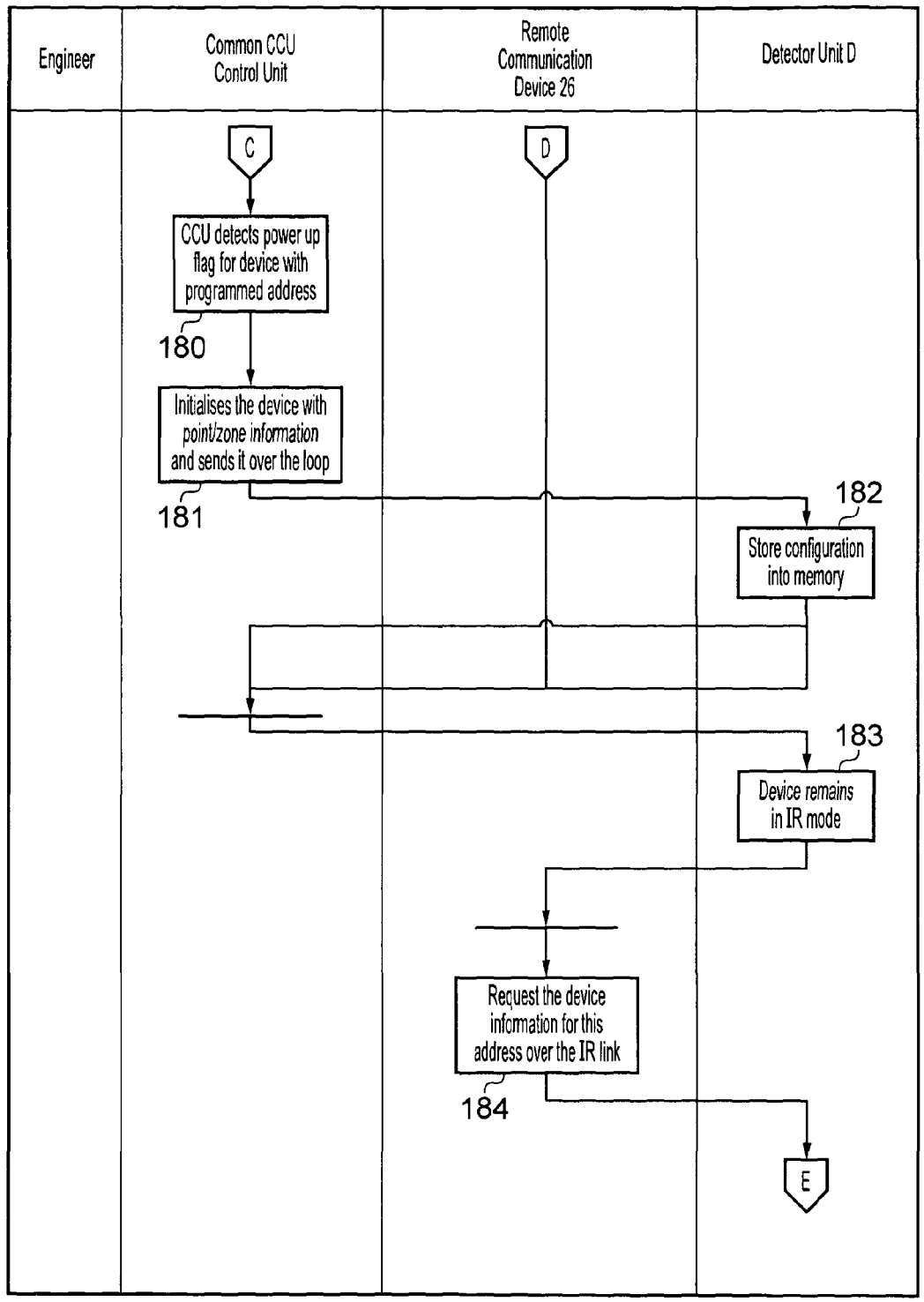
FIG. 7.3

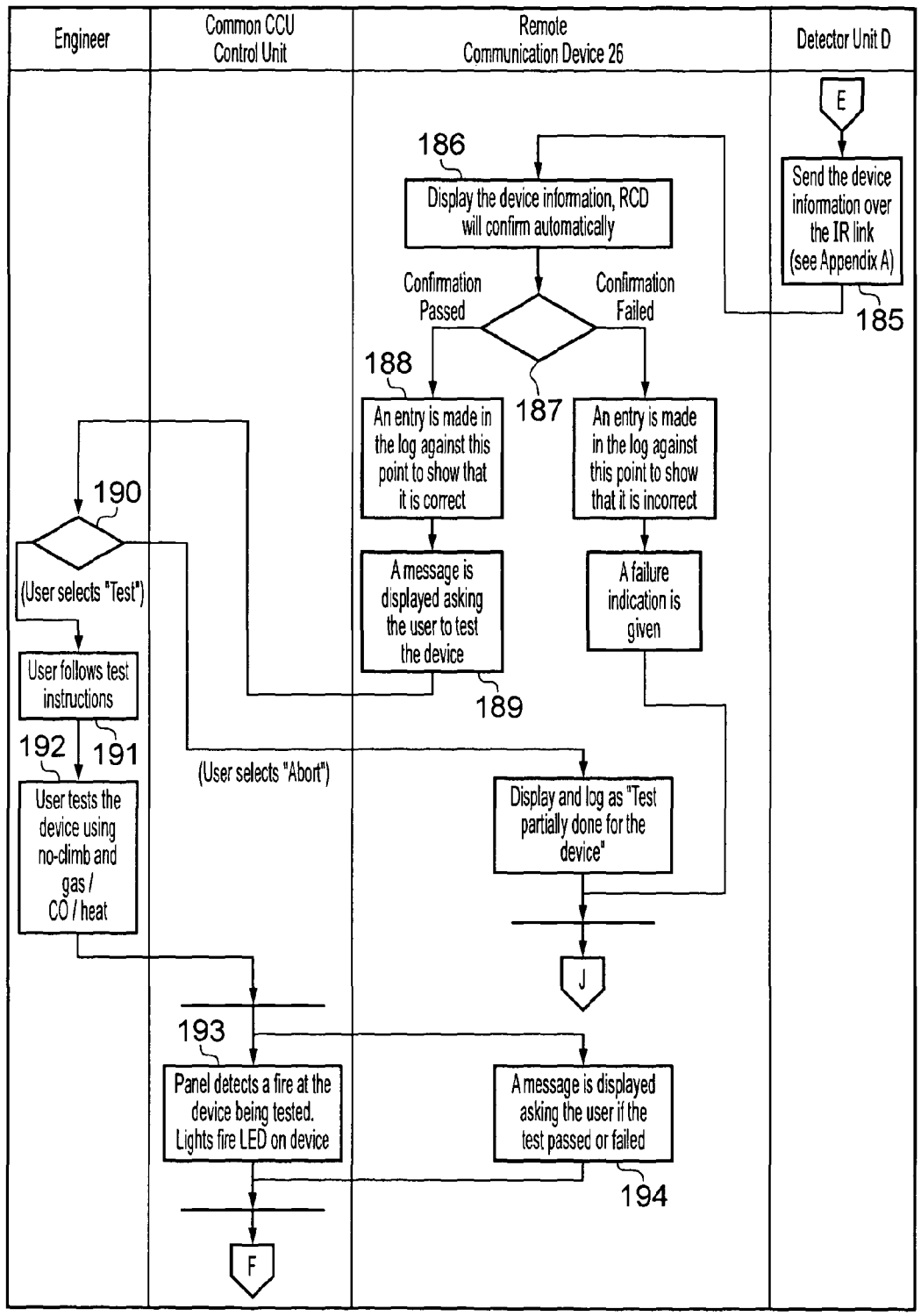
FIG. 7.4

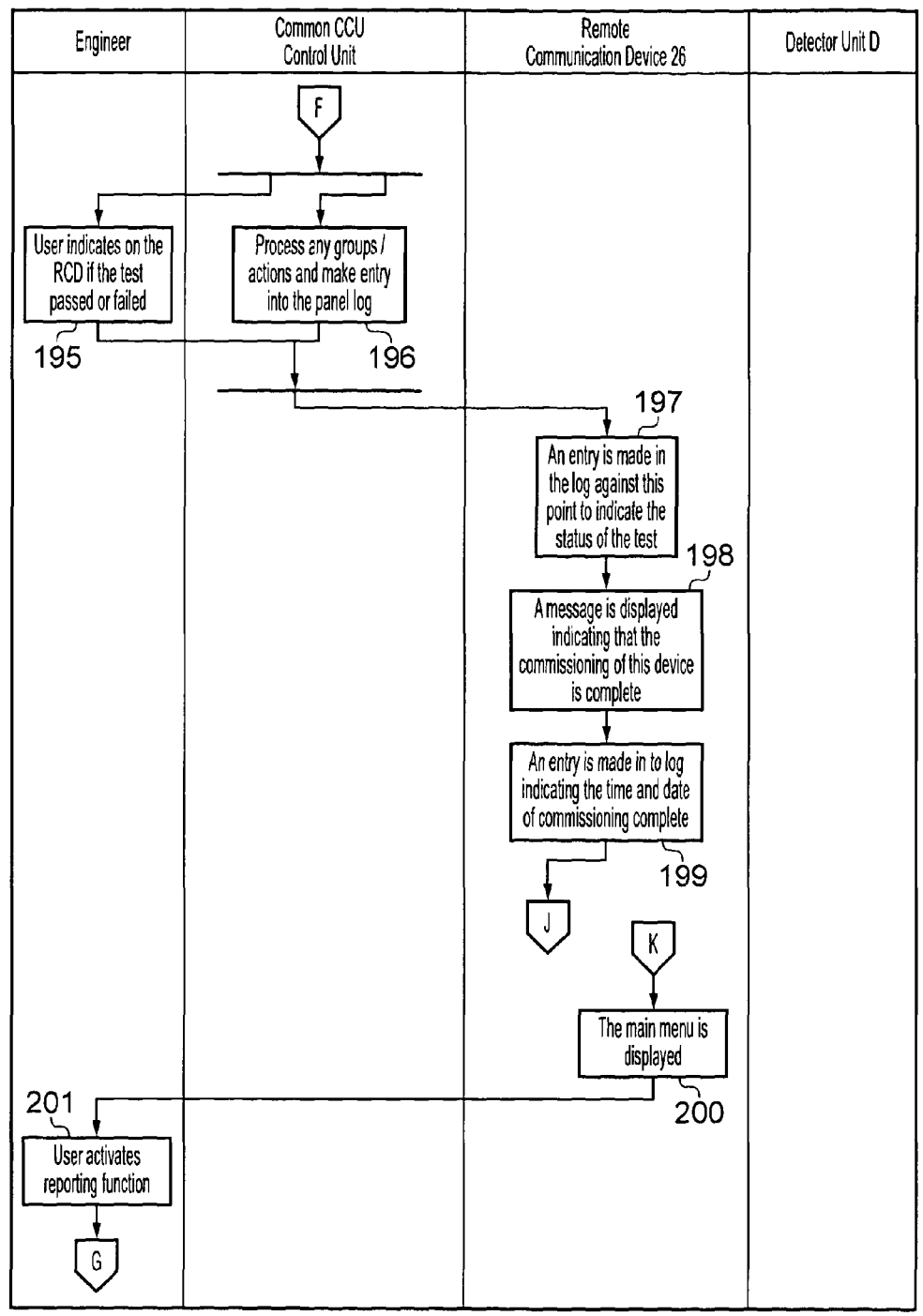
FIG. 7.5

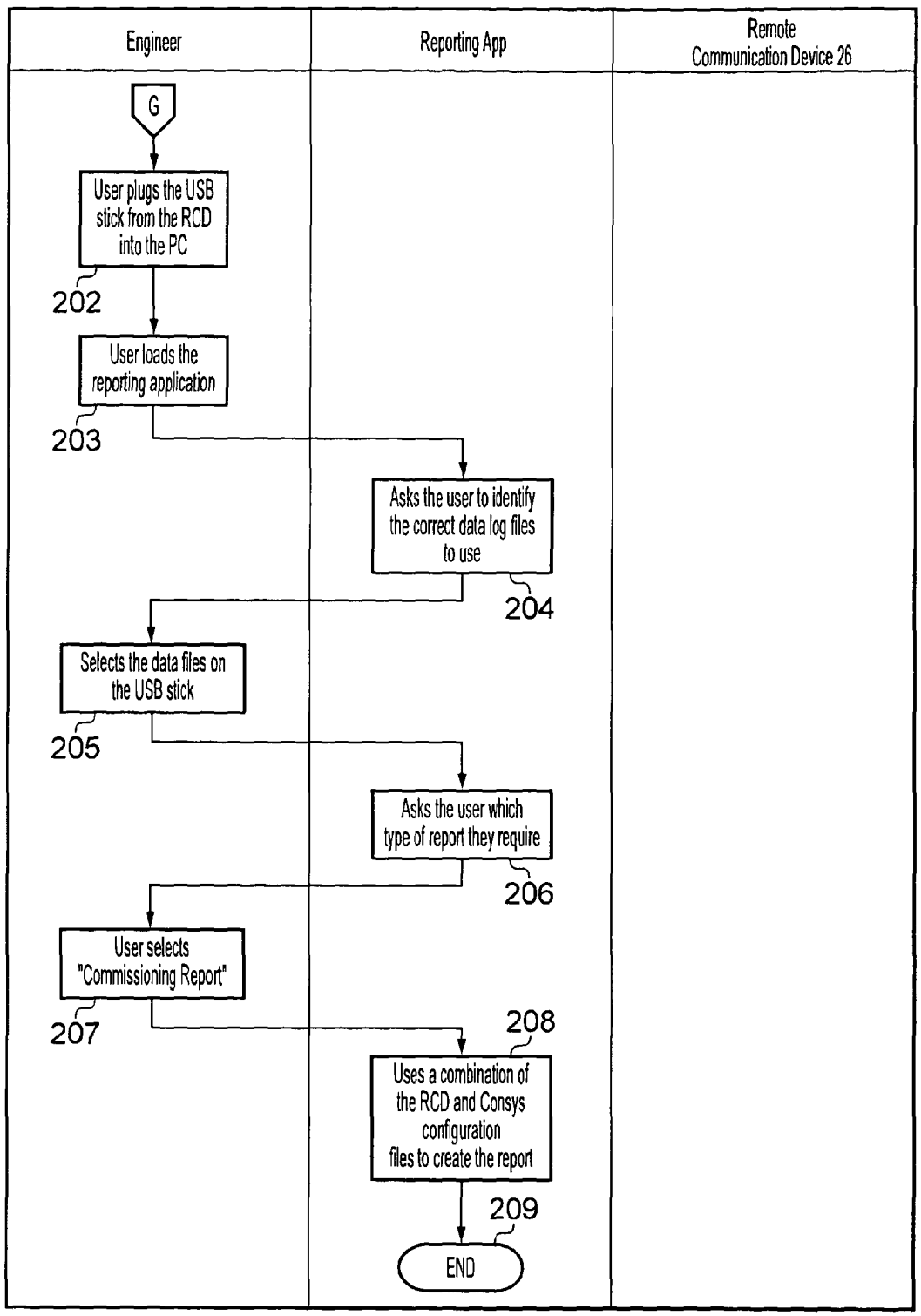
FIG. 7.6

SAFETY SYSTEM

This invention relates to a safety system having system units that have memories and, in particular, to a detector system having detectors with memories. The invention also relates to a method of commissioning a system, and a remote communication device.

Examples of known networked safety systems include fire and intrusion detection systems. A fire detection system installed in a building normally includes a number of detectors, each detector being located in a different room or region of the building. The detectors are connected to one another by either a wired, wireless, or combined wired and wireless common communication network, which also connects them to a common control unit (CCU). If a smoke detector detects smoke, then an alarm signal will be sent by the detector to the CCU via the network. The CCU will then send a signal via the network to an alarm indication unit, such as a sounder unit or a visual indicator, such as a strobe light. Typically, the CCU is located by an entrance to the building so that, in the event of an alarm signal being sent to the CCU, the CCU can easily be seen, for example by emergency service personnel, so that they can determine where in the building smoke has been detected.

When a new detection system is installed in a building, each detector must be connected to the common communication network, and an engineer must activate each detector in the detection system. The engineer must also ensure that each detector is functioning correctly, and must be confident that, in the event that smoke, for example, is present within a detectable range of the detector, the detector will detect the smoke, and send an alarm signal to the CCU. The process of preparing the system for use is known as "commissioning".

A detector may also be commissioned if it is added to an existing detection system, or if an existing detector is replaced by a new detector. The commissioning process also includes registering the detector with the CCU, so that the CCU can display the exact location of any detector in the detection system.

When commissioning a detection system or an individual detector, and also during maintenance or testing, it is often necessary to communicate with individual detectors, groups of detectors, or even entire systems of detectors in a detection system, for example to run self-test programs, or to update information stored in a memory of a detector, such as its location in the building.

In a known detector system, an engineer communicates with, and partially commissions, detectors using a portable, hand-held device which the engineer carries around the building to each detector. Each detector in a system has a unique identifier; that is, a sequence of characters such as alphanumeric characters and punctuation mark characters. For example, numbers between 0 and 250 may be used to define its position within the system. When the detectors are first installed, they all have the same identifier. The engineer must, therefore, allocate each detector with its own unique identifier. This is the first stage of the two stage commissioning process. The detectors are normally mounted in a back box, which is often mounted in the ceiling. The engineer locates each detector in turn, using a plan of the system which he is able to obtain as a printout from the CCU. When he reaches a detector, he removes the detector from the back box, and connects the detector to the hand-held device. The engineer is then able to commission the detector, by allocating an address to it. Once the detector has been commissioned, the engineer mounts it back in the back box, where it reconnects to the CCU. The engineer must then move around the building, visiting each detector. Since the detectors are typically mounted in difficult to reach places, such as on a ceiling, the engineer must use specialist climbing or lifting equipment to access each detector.

The second stage of commissioning involves the engineer walking round and checking that each detector works correctly, by causing each detector to sense an alarm condition. In a fire detection system, he may do this by applying smoke to the detector. The detector sends an alarm signal to the CCU. The CCU is configured not to activate alarm indication units such as sounder units during the commissioning process. Instead, the CCU illuminates an LED on the detector, so that the engineer can tell that the detector correctly detected the smoke.

When an individual detector needs updating, an engineer working alone must first put the detector, or a group of detectors, into a non-detecting mode so that the engineer can carry out the required work. The engineer does this at the CCU. He then locates the first detector that requires an update, removes the detector from the ceiling, attaches it to the hand held device, and performs any work necessary on the detector. Once the required work has been carried out, and the detector has been reconnected to the system, the engineer must return to the CCU and put the detector back into its normal operating and detecting mode. The engineer then puts the next detector to be updated into a non-detecting mode, locates that detector, removes it from its back box, and carries out the required work on it, before returning to the CCU to put the detectors back into its normal mode. The engineer must repeat this process for each detector that requires updating. A disadvantage of this system is that the engineer must spend a lot of time travelling between the detectors and the CCU.

Sometimes, two engineers visit a site to carry out the required work. The first engineer might walk around the building, locating each detector and carrying out the required work, while the second engineer remains at the CCU, to put the detectors back into a non-detecting mode when instructed by the first engineer by telephone or radio. The second engineer then puts the detectors back into their normal detecting mode once instructed by the first engineer. Having a second engineer present reduces the amount of time spent travelling between the detectors and the CCU. However, if a second engineer is present, then the cost of commissioning the detectors or carrying out the required work can be significantly increased.

An aim of the present invention is to address some of these problems.

According to a first aspect, the present invention provides a method of configuring a unit of a networked safety system, the unit being connected to the network and having a memory and an optical data receiver; and the method comprising the steps of: transmitting an optical data signal to the unit; and recording data included in the optical data signal onto the detector's memory. Preferably, the optical data signal is transmitted by a remote communication device having an optical data transmitter. An advantage of the detector being configurable via an optical data signal is that an engineer does not need to physically access the unit. Thus, there is no need to remove the unit from its mounted position which, in many cases, is a ceiling. A safety risk is, therefore, removed. Another advantage is that the engineer does not need to travel back and forth between the unit and the common control unit to complete the commissioning process. The process can be carried out by an individual engineer, commissioning the units remotely from both the units and from the control unit. This results in a saving in time and cost. An additional advantage is that, if necessary, it is possible to make changes while maintaining a live safety system.

Preferably, prior to transmitting an optical data signal to the unit, the method further comprises the step of activating the optical data receiver on the unit. Since the optical data receiver is not activated all the time, there is a reduced risk of the receiver receiving a spurious or illicit data signal.

Advantageously, once the optical data receiver on the unit has been activated, it remains activated for a predetermined period of time, after which time the optical data receiver is deactivated. If the optical data receiver on the unit fails to receive an optical signal within a predetermined period of time, the optical data receiver may be deactivated. An advantage of this is that, if the receiver does not need to remain in its activated state, it will be automatically deactivated. This reduces the chance that the receiver will receive a signal from a spurious or illicit source.

Advantageously, the method further comprises the step of deactivating the optical data receiver on said commissioned unit. This step may be carried out by the engineer at the control unit, or remotely via the remote communication device. Deactivating the optical data receivers, once again reduces the chance of spurious or illicit signals being transferred to the units.

After the step of de-activating the optical data receiver has been completed, a common control unit in communication with the unit interrogates the unit to determine whether or not any changes have been made in the memory of the unit. Advantageously, the method further comprises the step of updating a memory in the common control unit with changes identified in the memory of the unit. This has the advantage of updating the control unit's memory with any changes that have been made to the memory of the unit. The control unit effectively 'pulls' the data from the units, when it is ready. This means that, if changes have been made to many detectors, the changes will be updated in the control unit's memory when the control unit requests it, thus reducing the chance that the units will clog the system by sending details of the changes to their memories at the same time.

Preferably, the unit further comprises an optical data transmitter, and the remote communication device further comprises an optical data receiver, the optical data transmitter of the unit being capable of transmitting an optical signal which can be received by the optical data receiver of the remote communication device. This has the advantage that two-way communication may take place between the remote communication device and the unit, so that information can be sent from the unit to the remote communication device, or it can be sent from the remote communication device to the unit. The memory in the unit may be read or edited by the remote communication device. A number of transmissions may take place between the remote communication device and the unit without the need for the unit to communicate with the common control unit. Only when the communication between the unit and the remote communication device has finished, and the IR connection has been deactivated, does the control unit 'fetch' the updated data from the unit's memory.

Advantageously, the safety system is a detection system, and the unit is a detector unit.

According to a second aspect of the present invention, a networked safety system comprises: a unit having an optical data receiver, and a memory for storing data relating to the unit; and a remote communication device having an optical data transmitter, and being capable of communicating with the unit via the optical data receiver; wherein optical data transmitted from the remote communication device to the unit can be stored in the memory of the unit.

Preferably, the unit further comprises an optical data transmitter, and the remote communication device further comprises an optical data receiver, the optical data transmitter of the unit being capable of transmitting an optical signal which can be received by the optical data receiver of the remote communication device.

Advantageously, the remote communication device is capable of downloading information stored in the memory of the common control unit. The downloaded information may be a plan of a site in which the safety system is installed. This allows the engineer walking round a site to have a plan of the site installed on the remote communication device that he is carrying, so he does not need to carry a separate map or plan showing where all of the units in the system are installed.

The system may further include a common control unit in communication with the unit.

Advantageously, the common control unit comprises a memory, and is arranged to interrogate the unit to determine whether data stored in the memory of the unit has been changed.

Preferably, the safety system is a detection system, and the unit is a detector unit.

According to a third aspect, the present invention provides a control unit for a networked safety system, the system including a plurality of units, each unit having an editable memory, the control unit being in communication with the plurality of units, and comprising: a user interface; a processor; and a memory; wherein the control unit is arranged to interrogate each unit to determine whether data stored in the memory of each unit has changed.

Advantageously, the control panel is arranged to enable and disable an optical data transmitter in each unit, and the interrogation of the memory of each detector is only carried out after the optical data transmitter has been disabled.

Preferably, if the control unit determines that the data stored in the memory of any unit has changed, then the control unit extracts the edited data, and stores said edited data in the memory of the control unit.

According to a fourth aspect of the present invention, a remote communication device for communicating with a unit in a networked safety system comprises: a user interface; and an optical data transmitter; wherein data inputted by a user via the user interface is transmittable via the optical data transmitter to a unit in said safety system.

Preferably, the remote communication device further comprises an optical data receiver; wherein data transmitted by a unit in said safety system is receivable by the remote communication device via the optical data receiver.

The invention will now be described in greater detail, by way of example, with reference to the drawings, in which:—

FIG. 7 is a flow diagram, split into parts 6.1 to 6.6 showing the process of commissioning a system or a part of a system.

Figure 1:
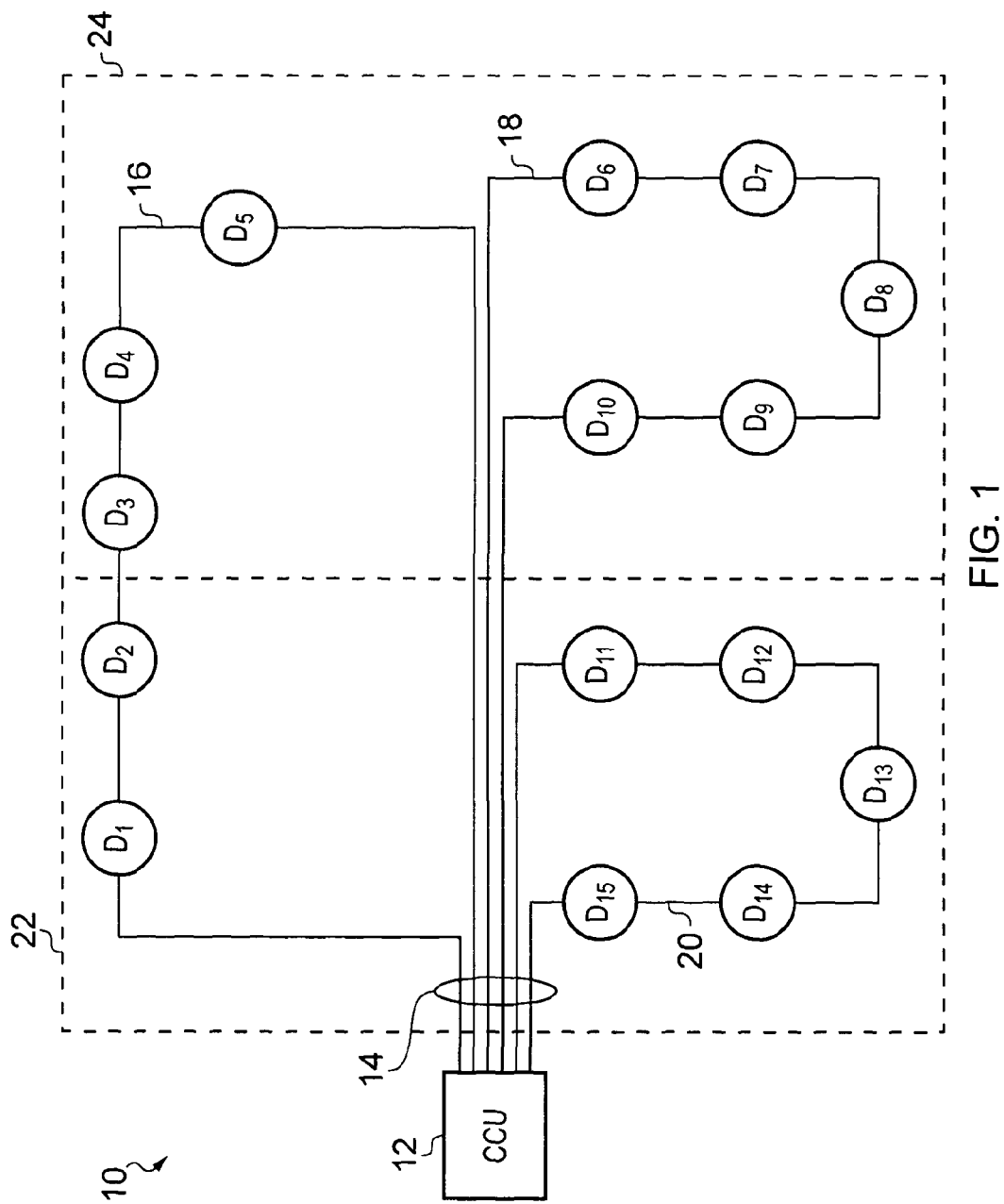
FIG. 1 is a schematic diagram of a safety system according to the present invention.

Referring to the drawings, FIG. 1 shows, schematically, a detection system 10 comprising a plurality of detectors $D_1$ to $D_{15}$ and a common control unit (CCU) 12. The detectors $D_1$ to $D_{15}$ are connected to the CCU 12 via a common communication network 14 which provides power to the detectors as well as enabling communication and, in this embodiment, is a wired connection, but may, in other embodiments, be a wireless connection. The detectors $D_1$ to $D_{15}$ are arranged on three loops 16, 18, 20. Each loop 16, 18, 20 may contain a number of detectors, and may represent a circuit of detectors in a particular area of a building. For example, one loop of the detection system may be installed for each floor of a building. Alternatively, the detectors could be connected in a loop, or in a spur.

In the embodiment shown in FIG. 1, a first loop 16 includes detectors $D_1$ to $D_5$, a second loop 18 includes detectors $D_6$ to $D_{10}$ and a third loop 20 includes detectors $D_{11}$ to $D_{15}$.

In addition to the various loops in the detection system, the detectors $D_1$ to $D_{15}$ may be allocated a particular zone. Two zones 22, 24 are shown in FIG. 1. Detectors $D_1$, $D_2$, and $D_{11}$ to $D_{15}$ are within a first zone 22, and detectors $D_3$ to $D_{10}$ are within a second zone 24. The zones 22, 24 of a building may correspond to the loops 16, 18, 20 of the system 10, or they may correspond to different regions or areas of a building or of the detection system within which it is desirable to treat the detectors as a group.

It will be appreciated that the detection system 10 may include any number of detectors $D_1$ to $D_{15}$, on any number of loops, and within any number of zones. In the following description of the invention, a detector will, unless otherwise stated, be given a general reference D.

Figure 2:
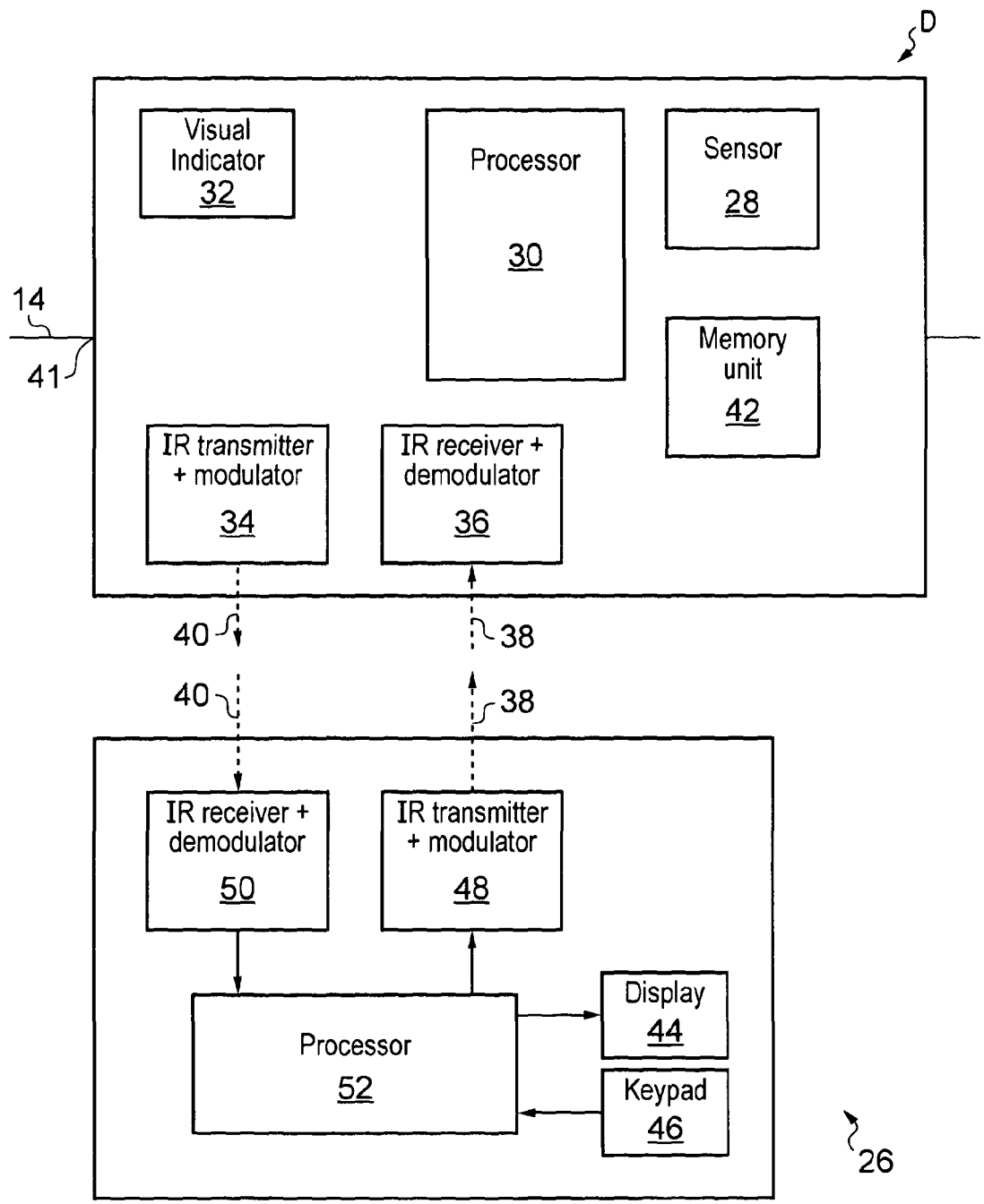
FIG. 2 is a schematic diagram of a detector unit and a remote communication device according to the invention.

FIG. 2 shows, schematically, a detector D in greater detail. FIG. 2 also shows a remote communication device 26, which is used to communicate with the detector D.

The detector D is connected to the CCU 12 (not shown) via a common communication network 14. The detector D includes a sensor 28 for sensing a particular condition. The type of sensor 28 associated with the detector D depends on the purpose of the detection system 10. For example, in a fire detection system, the detector D may be a fire detector such as a smoke detector, a heat detector, a flame detector or a carbon monoxide detector and, therefore, the sensor 28 may be a sensor to sense smoke particulates, temperature, a flame, or carbon monoxide accordingly. In an intrusion detection system, the detector D may be an intrusion detector, such as a motion sensor, a pressure sensor or a door switch. In the event that the sensor 28 senses a particular condition that corresponds to an alarm condition, the signal is sent to a processor 30. The processor 30 monitors the sensor 28, and communicates via the common communication network 14 with the CCU 12. If an alarm condition is detected, then the processor 30 sends a signal to the CCU 12 to indicate this, and the CCU instructs an audible or visual alarm to be generated.

The detector D also includes a visual indicator 32 for providing a visual output to a user. The visual indicator 32 may comprise one or more light emitting diodes (LEDs) or some other display unit capable of displaying information from a detector D, which is typically located on a ceiling, to a user on the ground.

An infrared transmitter 34 and an infrared receiver 36 are mounted in the detector D such that they are visible to a user on the ground beneath the detector D. The infrared (IR) receiver 36 is arranged to receive infrared signals 38 from the remote communication device 26. The signal is received by the IR receiver 36, and is demodulated by a demodulator (not shown) associated with the IR receiver 36. The demodulated signal is then processed by the processor 30. The IR transmitter 34 is arranged to emit infrared signals 40, which can be detected by the remote communication device 26. Prior to transmission, the signals are modulated by a modulator (not shown). While the embodiment of the invention shown in FIG. 2 has both an IR transmitter and an IR receiver and is, therefore, capable of receiving and transmitting infrared signals, the detector D may, in an alternative embodiment, include only an IR receiver 36. Such a detector D is capable of receiving signals 38 from the remote communication device 26, but is unable to transmit signals 40 to the remote communication device.

The point at which the common communication network 14 enters the detector D forms a network data port 41. Of course, that network brings not only data communication, but also power to drive the detector D. Data received from the central control unit 12 via the common communication network 14 is passed to a multiplexer (not shown), and outgoing data being passed to the common communication network via the network data port 41 comes from a demultiplexer (not shown). The multiplexer/demultiplexer also receives data from the IR receiver 36 and directs data to the IR transmitter 34.

Data received by the multiplexer/demultiplexer from the network data port 41 or from the IR receiver 36 is directed to the processor 30 and data sent from the processor 30 is directed to the multiplexer/demultiplexer which directs it to the network data port 41 or the IR transmitter 34, as appropriate. The multiplexer/demultiplexer selects which of the incoming signals from the network data port 41 and the IR receiver 36 it will pass to the processor 30, and which one of the network data port 41 and IR transmitter 34 that it will send outgoing data to based on a chip select/enable signal received by the multiplexer/demultiplexer. The IR receiver and transmitter can be switched on and off based on whether the IR receiver and transmitter are enabled. This is determined by a signal from the processor 30, as well as a signal from an IR communications or carrier detector (not shown) which are passed to an AND gate. When both signals are high or '1', the multiplexer/demultiplexer routes messages to and from the IR receiver 36 and IR transmitter 34. The IR communications or carrier detector monitors the IR receiver 36 such that, as soon as the IR receiver receives an IR signal, it sends a high or "1" signal to the AND gate for a period of time, in this case two seconds. This gives the multiplexer sufficient time to receive and forward the data received by the IR receiver 36 to the processor 30. This also gives the processor sufficient time to send any reply signal to the IR transmitter 34 before the multiplexer returns to communicating with the network port 41.

The detector D includes a memory unit 42 for storing data relating to the detector and the detector system 10. In this embodiment, the memory 42 is an electrically erasable programmable read-only memory (EEPROM). However, a person skilled in the art will appreciate that any other suitable memory, such as a RAM, a PROM, an EPROM or solid state memory could be used. Ideally, the type of memory used in the detector D should be non-volatile.

The type of information stored in the memory 42 may include, but is not limited to, the name of the site in which the detection system is installed, the distinct number of the detector, the number of the loop on which the detector is installed, the zone in which the detector is located, a description of the location of the detector, the serial number of the detector, the manufacturer of the detector, the date of manufacture of the detector, the date of commissioning of the detector, the detector's service history, the record of the detector's self-test failures, the detector's mode and sensitivity, and an event log for storing details of events that have taken place in, or associated with, the detector. If the event log becomes full, then any new event replaces the earliest stored event in the event log.

The memory 42 is such that certain information stored thereon can be edited, deleted or added by a user. The information stored in the memory 42 that can be edited, deleted or added by a particular user may depend on the rights of that user. For example, while an engineer may have rights to access all information stored in the memory, or to read and write to the memory, another user may have rights only allowing him restricted access to information, such as only being able to read the memory, not to write to it.

The remote communication device 26, shown schematically in FIG. 2, is in the form of a hand-held electronic device, having a display unit 44 for displaying information to a user, and a keypad 46, for receiving an input from the user. The display 44 may be any display suitable for visibly communicating data to a user, such as a liquid crystal display (LCD). The keypad 46 may include a series of alphanumeric keys arranged, for example, in the form of a QWERTY keyboard, a touch-sensitive keypad, a touchpad or touch screen for entering alphanumeric data into the remote communication device 26.

The remote communication device 26 also includes an infrared transmitter 48, and an infrared receiver 50, which are similar to the IR transmitter 34 and the IR receiver 36 in the detector D. The IR transmitter 48 of the remote communication device is arranged to transmit infrared signals 38 towards the infrared receiver 36 in the detector D. Similarly, infrared signals 40 that are transmitted by the infrared transmitter 34 in the detector D can be received by the infrared receiver 50 in the remote communication device 26. Signals transmitted by the IR transmitter 48 are modulated by a modulator (not shown) in the remote communication device 26. Similarly, signals received by the IR receiver 50 are demodulated by a demodulator (not shown) in the remote communication device. A processor 52 is connected to the infrared transmitter 48 and the infrared receiver 50, and sends processed information to the display 44 for displaying to a user. The processor 52 also processes information entered by the user via the keypad 46.

Figure 3:
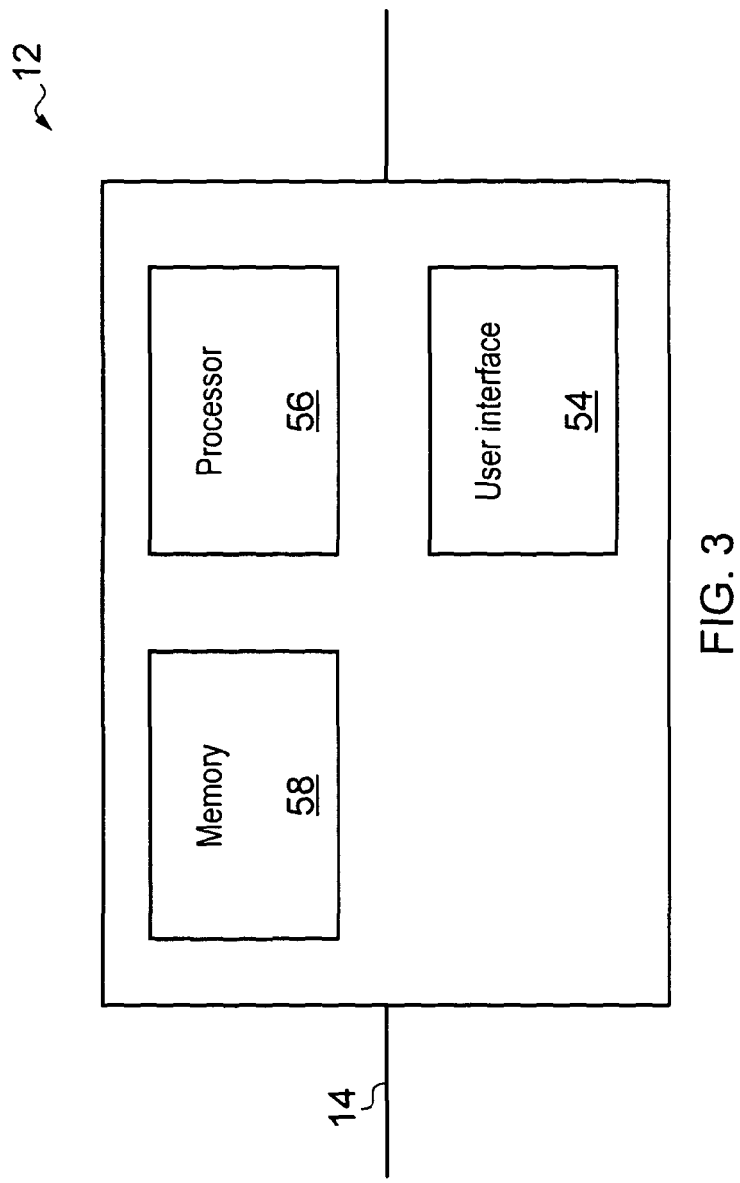
FIG. 3 is a schematic diagram of a control unit according to the invention.

FIG. 3 shows, schematically, the common control unit (CCU) 12. The CCU 12 is connected to the detectors D via the common communication network 14. The CCU 12 includes a user interface 54 which may include a display and a user input unit, such as a keyboard, for entering information. The CCU 12 also includes a processor 56 and a memory unit 58. The memory 58 stores information relating to each of the detectors D connected to the CCU 12 in the system 10. The CCU 12 may also include alarm indicators (not shown), such as a series of LEDs and/or an LCD display or the like, which can be illuminated to indicate to a user that a detector D connected to a CCU has detected an alarm condition.

When a detection system 10 is first installed, an engineer will register each of the detectors D in the system with the CCU 12. He may do this by entering details of each of the detectors D directly into the CCU via the user interface 54 or, alternatively, he may enter the details of the detectors into a computer, and then transfer the details to the CCU 12 via a wired or wireless connection. Details of each of the detectors 12, such as their location in the building, and their sensitivity, are entered during the registration process. When all of the data has been entered into the CCU 12, the data is transferred to the remote communication device 26 for transferring to the detectors during the commissioning process.

In use, the detectors $D_1$ to $D_{15}$ (see FIG. 1) are in a "normal" mode. In this mode, the detectors function normally and, if the sensor of a detector senses a condition which corresponds to an alarm condition, then the detector sends a signal to the CCU 12 to indicate that an alarm condition has been detected. The CCU 12 then sends a signal to a sounder, or some other alarm indicator unit to notify people in the building that an alarm condition has been detected. In the "normal" mode, the sensor 28 in each detector D is in operation, but the IR transmitter 34 and the IR receiver 36 are not supplied with power and, therefore, no signal can be transmitter by the IR transmitter, and no signal can be received by the IR receiver. In order for the IR transmitter 34 and the IR receiver 36 to function, it is necessary for the detector to be put into an IR communication mode. This is done by a user, for example an engineer, at the CCU 12, and the CCU instructs the detectors D to enable or disable IR communication mode as required.

The detection system and, in particular, the use of the remote communication device 26 to commission a detector, or to update information stored on a detector, will now be described by way of examples.

EXAMPLE 1

Figure 4:
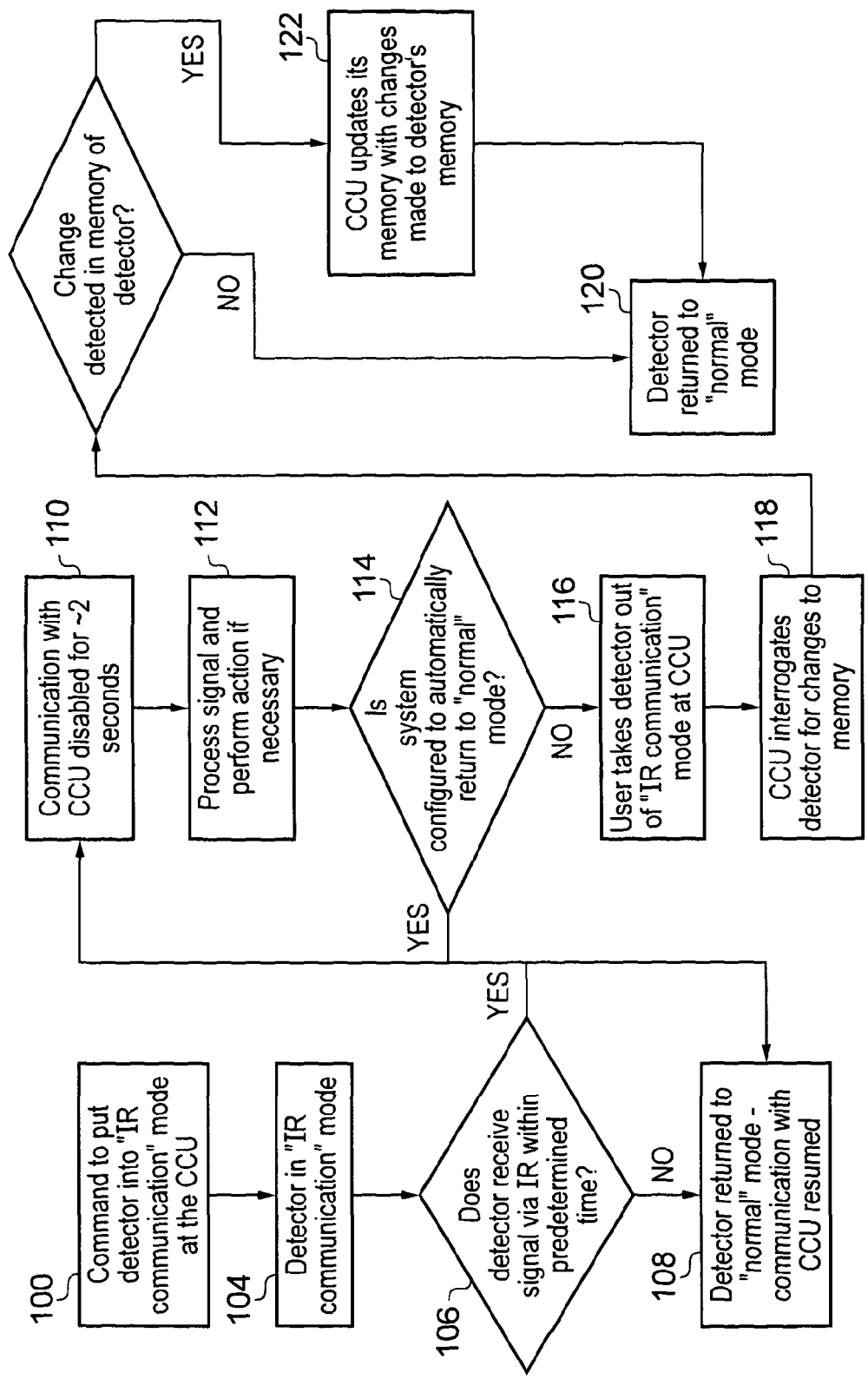
FIG. 4 is a flowchart detailing the steps of commissioning a detector.

FIG. 4 is a flow diagram showing how an engineer might commission a new detector D, which has been installed in a fire detection system 10. It is assumed, in this example, that the detector D is installed in an existing detection system 10, for example in a room of a building not covered by the existing fire detection system. Once the detector D has been physically installed and connected to the common communication network 14, an engineer is able to commission the detector. At the CCU 12, the engineer puts the detector into an IR communication mode (step 100).

The engineer activates the IR communication mode via an interface (not shown) on the CCU 12. The engineer may choose to put a single detector D (as in this example), a plurality of detectors, one or more loops of detectors, or one or more zones of detectors (see FIG. 1) into IR communication mode (Step 104).

In some embodiments of the invention, the detector D will remain in the IR communication mode indefinitely, until a user enters a command into the CCU 12 to tell the system to return to its "normal" operating mode. In the present embodiment, however, a timer is started when the detector is put into IR communication mode, and the CCU 12 determines whether or not an infrared signal 38 is received by the IR receiver 36 in the detector D within a predetermined period of time (step 106). The signal 38 that is received by the IR receiver 36 must meet certain criteria, for example within a particular frequency range, so that the detector D can identify the signal as originating from a valid remote communication device 26, and not from a spurious source, such as some other infrared transmitter.

If a valid IR signal 38 is not received within a predetermined period of time, then the CCU 12 automatically returns the detector to its "normal operating" mode, so that infrared signals cannot be received by, or transmitted from, the detector D (step 108).

If a valid IR signal 38 is received by the IR receiver 36 within the predetermined period of time, and the IR signal meets the required criteria, then the detector D accepts the signal. For a period of approximately two seconds, while the IR receiver 36 receives the signal 38, communication between the detector D and the CCU 12 is disabled (step 110). Once the signal 38 has been received, the processor 30 in the detector D processes the signal and, depending on the signal received, the processor will perform any action required (step 112), such as updating information stored in the memory 42, performing a self-test, or modifying the sensitivity of the sensor 28.

In some embodiments of the invention (step 114), the CCU 12 will be configured such that, once a detector D has received a signal 38 from the remote communication device 26, the CCU will automatically return the detector to its "normal" operating mode (step 108). In these embodiments, the detector D will be put into "normal" mode, and communication between the detector and the CCU 12 will continue uninterrupted.

In embodiments where the CCU 12 is not configured to automatically return the detector D to its "normal" operating mode, then the detector will remain in the IR communication mode until the mode is manually changed by a user at the CCU 12. Once the user has carried out all necessary work on the detector or detectors, he returns to the CCU 12, and enters a command to put the detector back into its "normal" operating mode (step 116).

As soon as the detectors are taken out of IR communication mode, the CCU 12 interrogates each detector to determine whether any changes have been made to the memory 42 in the detector (step 118). If a change has not been detected in the memory 42 of a detector D, then no change is made to the memory (not shown) in the CCU 12, and the detector continues to operate in its "normal" mode (step 120). However, if the CCU 12 determines that the memory 42 of a detector has changed, that is, that one or more entries have been added, deleted or amended, then these changes need to be updated on the memory of the CCU. The changes made to the memory will not immediately be transferred to the CCU as the detectors themselves do not send the updated information to the CCU 12. Only once the detector has been taken out of IR communication mode does the CCU carry out the interrogation of the entire system to identify changes in the memories of detectors. This ensures that the detection system is not clogged with data being transferred from a number of detectors at once. As a result of the CCU updating its memory with the changes made to the detector's memory 42 (step 122), the memory in the CCU 12 should contain up-to-date information stored in the detector, once that detector has been taken out of IR communication mode.

EXAMPLE 2

Another example of how an engineer might use the remote communication device 26 to communicate with a detector D will now be described.

It may be desirable to modify some of the information stored in a memory 42 of a detector D after the detector has been installed and commissioned. For example, it may be desirable to modify the name of the location of a detector D, or to change the sensitivity of a sensor 28 in a detector. To make the necessary modifications, an engineer must put the detector D into an IR communication mode at the CCU 12. As explained in example 1 above, changing the mode of a detector D causes communication between the detector and the CCU 12 to be temporarily disabled. Once the IR communication mode has been entered, communication between the detector D and the CCU 12 is re-established. The engineer then positions himself near the detector D, and aims the remote communication device 26 at the detector. With the detector D in IR communication mode, the IR receiver 36 is capable of receiving infrared signals 38 transmitted by the remote communication device 26. The engineer uses the keypad 46 on the remote communication device 26 to select, or enter a command, and a signal 38 is sent to the detector D.

Alternatively, or in addition, the engineer may request information from the detector D, such as a record of the detector's event history from the event log in the memory 42. The processor 30 in the detector D instructs the IR transmitter 34 to transmit a signal 40 containing the information requested by the user. The signal 40 is received by the IR receiver 50 in the remote communication device 26, and the requested information is displayed on the display 44 of the remote communication device.

The user is able to communicate directly with the detector D, obtaining information stored in the memory 42, editing that information if necessary, and adding further information to the memory, at ground level, using the remote communication device 26. The engineer does not need to climb a ladder to reach the detector D, as everything can be done from ground level.

EXAMPLE 3

A third example of how an engineer might use the remote communication device 26 to communicate with a detector D will now be described.

In order to check that a detector D is functioning correctly, and that it will send an alarm signal to the CCU 12 when an alarm condition is detected, an engineer might periodically instruct the detector to perform a self-test. To do this, the user enters a command into the CCU 12 to put the detector into the IR communication mode, as is described in examples 1 and 2. The user also puts the detector D into a "testing" mode, so that, in the event that the detector senses an alarm condition and communicates the alarm condition to the CCU 12, the CCU will not activate an audible or visual alarm. The engineer then positions himself near the particular detector D that is to be tested. The remote communication device 26 is aimed at the IR receiver 36 of the detector D, and the engineer enters a command via a keypad 46 on the remote communication device to instruct the detector to perform a self-test. The detector then carries out the self-test procedure, and an entry is made in the event log in the memory 42. The results of the self-test may also be transmitted by the detector D to the remote communication device 26. If on viewing the results of the self-test, the Examiner determines that a change needs to be made to a setting in the detector D, then he may make that change using the remote communication device 26, by sending an instruction via the IR transmitter 48. Once all required changes have been made to the memory 42 of the detector D, the engineer instructs the CCU 12 to return the detector to its "normal" operating mode. The CCU 12 then interrogates the detector D to determine whether any changes have been made to the memory 42 and, if so, those changes are recorded in the CCU's memory 58.

EXAMPLE 4

An example of how an engineer might use the remote communication device 26 to commission a detection system 10 will now be described.

Once the detector units D of a detection system have been installed and wired into the electrics of a building, the system 10 must be commissioned by an engineer. An engineer first enters details of each of the detectors D in the system 10 into a computer. Details such as the type of detector and the sensitivity of the sensor in the detector are entered into the computer by the engineer. The information regarding the system is then uploaded to the remote communication unit, so that it contains all of the information relating to the detectors D to be commissioned.

The CCU 12 may send the information to each of the detectors D in the system 10, so that the information relating to individual detectors can be stored in the memories 42 of the detectors. Alternatively the information may be uploaded via the IR data transmitter on the remote communication device.

A plan of the site in which the detection system is installed can be downloaded from the CCU onto the remote communication device 26, and the engineer can use this to locate each of the detectors in turn. After instructing the CCU 12 to put the detectors D into IR communication mode, the engineer walks around the building locating each detector. He positions himself near a detector, and uses the remote communication device 26 to upload information to the detector according to its position on the site plan stored in the remote communication device. An example of the information that might be uploaded is a label relating to the location of the detector. It is beneficial to allocate each detector with such a label, for example "lobby" or "conference room". The engineer is able to type this information into the remote communication device 26, and upload it to be stored in the detector's memory 42.

If the detectors have both infrared receivers and transmitters, then he engineer is able to interrogate the memory 42 of the detector D to check that the details stored on each memory are correct. Information relating to the detector D is sent via the detector's infrared transmitter 34 to the remote communication device 26. If the information is incorrect, then the engineer changes the information using the remote communication device, and uploads the corrected information to the detector's memory via the infrared transmitter 48.

If, however, the detectors have infrared receivers, but not transmitters, then they are capable only of one-way communication with the remote communication device 26. In this case, the engineer simply enters data, such as the location of the detector or the sensitivity at which the detector should function, and transmits the data to the detector D. The data is stored in the detector's memory, and the any required changes are carried out.

The engineer repeats this process with each of the detectors in the system, so that all of the detectors are updated with correct information. He then returns to the CCU 12 and instructs it to take the detectors out of IR communication mode, and put them back into normal mode. The CCU 12 then interrogates each of the detectors D in the system 10 for changes that have been made to their memories. Any changes that are found to have been made are also made in the memory of the CCU 12.

An engineer is able to carry out the commissioning process alone, and with only a single trip around the building since he can communicate via the remote communication device 26 directly with each detector. Since he has access to the memory in each detector, there is no need for him to travel back to the CCU each time the memory of a detector needs to be updated.

It will be appreciated by a person skilled in the art that various modifications may be made to the invention without departing from the scope of the claims.

EXAMPLE 5

Figure 5:
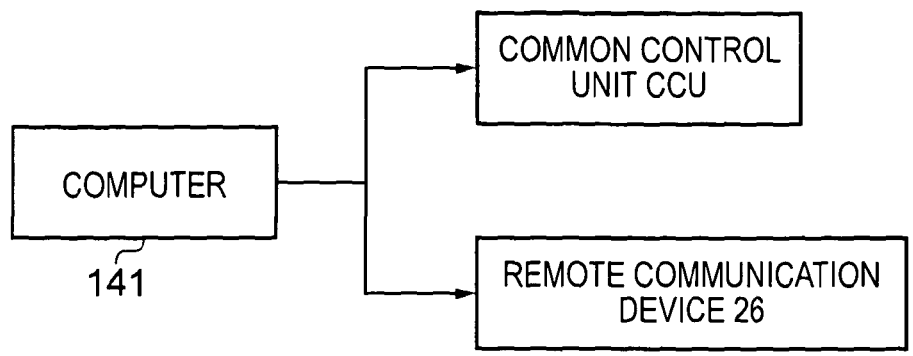
FIG. 5 is a block diagram showing one way of connecting a computer to the system.

A further embodiment in which the whole or a part of a detector system is commissioned will now be described with reference to FIGS. 5, 6 and 7. As in the above embodiments, a common control unit CCU is connected via network to a plurality of detector units. The commissioning process requires the use of a computer 141 executing detector system configuration software by which the detector system can be defined. For example, the computer system can allow a user to define the connections from the common control unit CCU to the various detector units, sounders, call points and the like within the system. Each component within the system can be allocated a unique address on the system, the location of each detectors can be identified, and the appropriate properties of each detector unit can be defined, for example sensitivity level and the like. Once the system has been defined by the software running on the computer 141 as configuration data, that configuration data can be downloaded onto the common control unit CCU and the remote communication device 26. This can be downloaded in a number of different ways. In FIG. 5, the computer 141 is shown connected both to the common control unit CCU and to the remote communication device 26 so as to download the configuration data directly. The arrangement shown in FIG. 6, however, shows the configuration data being downloaded from the computer 141 to the common control unit CCU, and then being sent from the common control unit CCU to the remote communication device 26.

The commissioning process of this embodiment will now be described in detail with reference to the flow diagram of FIG. 7. The length of the flow diagram is such that the process is spread over six pages. In the flow diagram, the process is divided into four columns representing the action taken by an engineer; by the common control unit CCU; by the remote communication device 26; and by the detector D.

In step 161, the installing engineer configures the whole or a part of the detector system on a computer using detector system configuration software executing on the computer 141. Once complete, he downloads the configuration in the form of configuration data to the common control unit CCU in step 162, and to the remote communication device 26 in step 163, these steps corresponding to the arrangement shown in FIG. 5. If the arrangement of FIG. 6 is used, the configuration data is downloaded to the remote communication devices by the common control unit CCU.

The engineer will then prepare to test the commissioning of each detector D by placing the system in a test mode in step 167 and 168 by switching the IR mode on at the common control unit CCU. The common control unit CCU will send an "IR mode ON" command to the required section or loop of the detector system every five seconds, or where the whole system is being commissioned for the first time, to the whole system. This takes place in step 169. The "IR mode ON" command is sent to the relevant detector units 4, and in step 170, each of those detector units 4 receives the signal and enters its IR mode.

The engineer will take the remote communication device 26 and place it in commissioning mode in step 151. In step 152, the remote communication device will check all devices within the configuration data of the detector system to identify those which have not been commissioned. If it finds devices which require configuration (step 153), it will display a list of those devices on its screen in step 154. The engineer can then move the remote communication device 26 to those detectors which have not yet been commissioned (step 155).

When the engineer reaches one of the devices from the list on the remote communication device 26, he will select that device from the list on the remote communication device 26 in step 171. This causes the remote communication device 26 to start communicating with the detector D. The detector D, which has not been commissioned, contains a default address which must be changed to its final commissioned address which is defined by the configuration created by the engineer in step 161. In step 172, the remote communication device 26 sends the new address of the detector D to the detector D via the IR transmitter. Step 173 achieves a handshake in which the detector D transmits by its IR transmitter the address that it has now been programmed with. The remote communication device 26 compares this, in step 174, with the correct address, and if correct re-addressing has failed, the device is not commissioned in step 175, and the engineer retries to set the devices address, in step 176, for a few number of times. Once the address has been correctly placed in the detector D, the remote communication device causes the detector D to be switched on, and, in step 178, this raises its power-up flag using the new address. This power-up flag is detected by the common control unit CCU in step 180, which then initialises the device with point and zone information. This tells the detector where it is located both within the building or environment it is located, and within the detector system. Therefore, it includes information on which circuit the detector unit is located as well as what room the detector is located in. Other configuration information may be transmitted to the detector D, such as the sensitivity level that is to be used. This configuration data is stored in the memory of the detector D in step 182.

From step 183, the detector device 5 is maintained in IR mode, and in step 184, the detector D is asked to supply the configuration data it has received from the common control unit CCU by the remote communication device 26. This is requested via the IR link, and the data is sent via the IR link and is displayed on the remote communication device 26 in step 186. In step 187, this is compared with the configuration data of that detector D that is already stored in the remote communication device 26. If it is confirmed to be correct, this is recorded in a log in step 188, and the engineer is requested by the remote communication device 26 to test the detector D. The engineer then indicates in step 190 if he will conduct the test, and on the assumption that he will, he follows the test instructions in step 191 and in step 192, and steps 193 and 194 the results of the various tests are displayed or recorded. The engineer records the results in step 195, and the common control unit processes the results in a log in the common control unit in step 196. The record of the results is made in a log in the remote communication device in step 197. If the device fails the test, or requires a change in the configuration, the engineer will make an entry of this kind in the log within the remote communication device 26 at this point. To facilitate this, the remote communication device 26 includes a QWERTY keypad. Once commissioning is complete, a message is displayed in step 196 to that effect and information concerning the time and date of the commissioning process is entered into the log-in step 199.

Once each detector D has been commissioned, the engineer returns to the computer 141 and activates a reporting function within the software in step 201. The engineer connects the remote communication device 26 to the computer in step 202 and loads the reporting application software 203 on the computer. The engineer and the reporting application go through various steps to import the commissioning data files to create a report in step 208. If the configuration of a detector D needs to be changed, as noted by the engineer during the commissioning process, he will make these changes to the configuration software on the computer 141, and repeat a number of the steps that he has taken during his first test. He will download the updated configuration data onto the common control unit CCU and the remote communication device 26, and will return to the detector D to do a re-test. Once this is satisfactory, the commissioning process is complete. A commissioning report can be printed as a record of the completion of the process.

The remote communication device 26 can be enhanced such that, if any changes to the configuration are required, they can be made during the commissioning process, while the engineer is using the device to communicate with the detector 4. He can use the device 5 to change the configuration, and this updates the configuration data on the remote communication device 26 as well as in the detector unit. At the end of the configuration process, when he returns to the computer 141, the change in configuration of the detector D is imported into the configuration software running on the computer 141, and this updated configuration is then downloaded onto the common control unit so that it is updated so as to correspond exactly with the configuration data of the detector unit.

Figure 6:
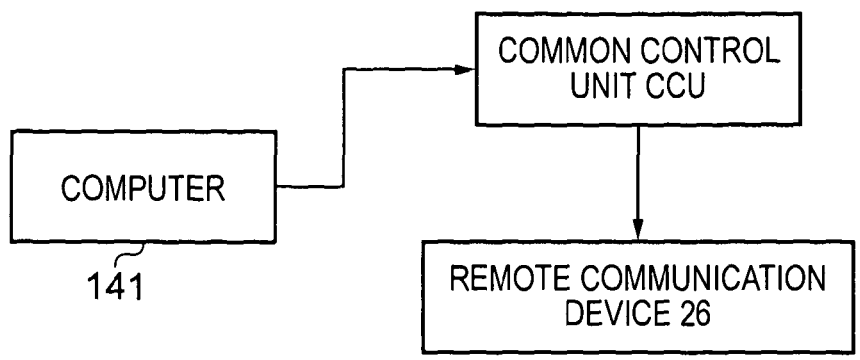
FIG. 6 is a block diagram showing another way of connecting a computer to the system.

List of Steps in FIG. 6

151 Place remote communication device 26 in commissioning mode
152 Check device list for devices which have not been commissioned
153 Decision box to identify if any devices have not yet been commissioned on the system
154 Display list of devices
155 Walk to detector location
161 Configure configuration software on computer
162 Download configuration from software onto common control unit
163 Download configuration of system to remote communication device
164 Initialise and configure any detector units not already set up
165 Store configuration into memory
166 Raise any faults due to missing/non-addressed detector units
167 Enable walk test mode for detectors which are to be commissioned
168 Place common control unit into IR mode for required loop(s)
169 Common control unit sends "IR mode ON" command to required loop(s) every five seconds
170 Device switches on IR circuitry
171 Select the device from the list on the remote communication device.
172 Send new address to device via IR link if device has default address
173 Confirm address which has been programmed into device
174 Decision box to identify if address has been correctly programmed into detector unit
175 Make note that device is not commissioned
176 Engineer tries this for a few number of times
177 Raise the power-up flag of the detector unit over the IR link
178 Device resets and raises its power-up flag. The detector unit uses the new address.
179 Display a message to the user informing them that the device is being configured
180 Panel detects power up flag for device with programmed address
181 Initialises the device with point/zone information and seals it over loop
182 Store configuration into memory
183 Device remains in IR mode
184 Request the device information for this address over the IR link
185 Send device information over the IR link
186 Display the device information, remote communication device will confirm automatically 187 Decision box as to whether confirmation passes or fails
188 An entry is made in the log against this point to show that it is correct
189 A message is displayed asking the user to test the device
190 Decision box for the engineer to decide whether to conduct test
191 User follows test instructions
192 User tests the device using no-climb and gas/co heat
193 Common control unit detects a fire and the device being tested. Lights fire LED on device
194 A message is displayed asking the user if the test passed or failed
195 User indicates on the remote communication device if the test passed or failed
196 Process any groups/actions and make entry into the log of the common control unit
197 An entry is made in the log against this point to indicate the status of the test
198 A message is displayed indicating that the commissioning of this device is complete
199 An entry is made in the log indicating the time and date of commissioning complete
200 The main menu is displayed
201 User activates reporting function
202 User plugs remote communication device into computer
203 User loads reporting application
204 Asks the user to identify the correct data log files to use
205 Selects the data files
206 Asks the user which type of report they require
207 User detects "commissioning report"
208 Uses a combination of the remote communication device and the configuration data files to create the report
209 End

The invention claimed is:

1. A method of configuring a unit of a networked safety system, the unit being connected to the network, and having a memory and an optical data receiver; and the method comprising the steps of:
   activating the optical data receiver on the unit;
   transmitting an optical data signal to the unit;
   recording data included in the optical data signal onto the unit's memory;
   de-activating the optical data receiver on said unit after a predetermined period of time; and
   after de-activating the optical data receiver, a common control unit in communication with the unit interrogating the unit to determine whether or not any changes have been made in the memory of the unit.

2. A method according to claim 1, wherein the optical data signal is transmitted by a remote communication device having an optical data transmitter.

3. A method according to claim 1, wherein, if the optical data receiver on the unit fails to receive an optical signal within a predetermined period of time, the optical data receiver is deactivated.

4. A method according to claim 1, further comprising the step of updating a memory in the common control unit with changes identified in the memory of the unit.

5. A method according to claim 1, wherein the unit further comprises an optical data transmitter, and the remote communication device further comprises an optical data receiver, the optical data transmitter of the unit being capable of transmitting an optical signal which can be received by the optical data receiver of the remote communication device.

6. A method according to claim 1, wherein the safety system is a detection system, and the unit is a detector unit.

7. A method according to claim 1, wherein the optical data signal is an infrared signal.

8. A method according to claim 1, further comprising moving a remote communication device to the unit, and operating it to transmit the optical data signal.

9. A method according to claim 8, further comprising creation of a configuration of the networked safety system to create configuration data; and passing/over the configuration data to the common control unit and to the remote communication device.

10. A networked safety system comprising:
    a unit having an optical data receiver, and a memory for storing data relating to the unit;
    a remote communication device having an optical data transmitter, and being capable of communicating with the unit via the optical data receiver; and
    a common control unit comprising a memory and in communication with the unit, the common control unit arranged to interrogate the unit to determine whether data stored in the memory of the unit has been changed;
    wherein optical data transmitted from the remote communication device to the unit can be stored in the memory of the unit; and
    wherein the remote communication device is capable of downloading information stored in the memory of the common control unit, the downloaded information comprising a plan of a site in which the safety system is installed.

11. A system according to claim 10, wherein the unit further comprises an optical data transmitter, and the remote communication device further comprises an optical data receiver, the optical data transmitter of the unit being capable of transmitting an optical signal which can be received by the optical data receiver of the remote communication device.

12. A system according to claim 10, wherein the safety system is a detection system, and the unit is a detector unit.

13. A control unit for a networked safety system, the system including a plurality of units, each unit having an editable memory, the control unit being in communication with the plurality of units, and comprising:
    a user interface;
    a processor; and
    a memory;
    wherein the control unit is arranged to interrogate each unit to determine whether data stored in the memory of each unit has changed; and
    wherein, if the control unit determines that the data stored in the memory of any unit has changed, then the control unit extracts the edited data, and stores said edited data in the memory of the control unit.

14. A control unit according to claim 13, wherein the control unit is arranged to enable and disable an optical data transmitter in each unit, and the interrogation of the memory of each detector is only carried out after the optical data transmitter has been disabled.

* * * * *